US012663816B2

(12) United States Patent (10) Patent No.: US 12,663,816 B2
Akaike (45) Date of Patent: Jun. 23, 2026

(54) GROUP CONTROL SYSTEM AND GROUP CONTROL METHOD

(71) Applicant: TOYOTA JIDOSHA KABUSHIKI KAISHA, Toyota (JP)

(72) Inventor: Kiyomasa Akaike, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 18/419,925

(22) Filed: Jan. 23, 2024

(65) Prior Publication Data

US 2024/0393808 A1 Nov. 28, 2024

(30) Foreign Application Priority Data

May 26, 2023 (JP) ................................. 2023-087172

(51) Int. Cl.
*G05D 1/693* (2024.01)
*G01C 21/16* (2006.01)
(Continued)

(52) U.S. Cl.
CPC ........... *G05D 1/693* (2024.01); *G01C 21/165* (2013.01); *G05D 1/646* (2024.01); *G08G 9/02* (2013.01);
(Continued)

(58) Field of Classification Search
CPC .... G05D 1/693; G05D 1/646; G05D 2111/52; G05D 2101/15; G05D 2107/70;
(Continued)

(56) References Cited

U.S. PATENT DOCUMENTS

2003/0216865 A1* 11/2003 Riewe ..................... G01S 19/47
701/470
2004/0174297 A1* 9/2004 Cho ......................... G01S 19/48
342/464
(Continued)

FOREIGN PATENT DOCUMENTS

CN 111947644 B * 4/2022 ........... G01S 5/0284
JP 2017-142778 A 8/2017

OTHER PUBLICATIONS

CN 111947644 B, Huo et al., "Outdoor Mobile Robot Positioning Method and System and Electronic Equipment Thereof", Filed: Aug. 10, 2020, Published: Apr. 12, 2022, English Translation (Year: 2022).*

(Continued)

*Primary Examiner* — Jason Holloway
*Assistant Examiner* — Benjamin J Brosh
(74) *Attorney, Agent, or Firm* — SoraIP, Inc.

(57) ABSTRACT

The group control system controls a plurality of mobile objects capable of autonomously traveling in a predetermined area. The group control system includes a position information estimation unit that estimates position information of each mobile object, a route planning unit that creates a route plan of each mobile object based on the estimated position information, an acceleration data acquisition unit that acquires acceleration data acquired from the acceleration sensor, and a mobile object position acquisition unit that acquires an actual position of each mobile object using the position sensor, and learns the deep reinforcement learning model so as to correct a deviation amount between an actual position of the mobile object acquired using the position sensor and an estimated position of the mobile object based on the acquired acceleration data.

2 Claims, 6 Drawing Sheets

(51) Int. Cl.

| | |
|---|---|
| *G05D 1/646* | (2024.01) |
| *G08G 9/02* | (2006.01) |
| *G01S 19/47* | (2010.01) |
| *G01S 19/49* | (2010.01) |
| *G05D 101/15* | (2024.01) |
| *G05D 105/20* | (2024.01) |
| *G05D 107/70* | (2024.01) |
| *G05D 111/50* | (2024.01) |
| *G05D 111/60* | (2024.01) |
| *G05D 111/67* | (2024.01) |

(52) U.S. Cl.
CPC .............. *G01S 19/47* (2013.01); *G01S 19/49* (2013.01); *G05B 2219/37506* (2013.01); *G05D 2101/15* (2024.01); *G05D 2105/20* (2024.01); *G05D 2107/70* (2024.01); *G05D 2111/52* (2024.01); *G05D 2111/60* (2024.01); *G05D 2111/67* (2024.01)

(58) Field of Classification Search
CPC ........... G05D 2105/20; G05D 2111/67; G05D 1/242; G05D 1/0289; G05D 1/0291; G08G 1/161; G08G 5/80; G08G 7/02; G08G 9/02; G01S 19/40; G01S 19/47; G01S 19/49; G05B 2219/37506; G05B 2219/39287; G05B 2219/35408; G01C 23/00
See application file for complete search history.

(56) References Cited

U.S. PATENT DOCUMENTS

| | | | | |
|---|---|---|---|---|
| 2015/0354966 | A1* | 12/2015 | Morin | ..................... G01S 11/12 |
| | | | | 701/468 |
| 2015/0369923 | A1* | 12/2015 | Morin | ..................... G06T 7/277 |
| | | | | 701/472 |
| 2019/0049967 | A1* | 2/2019 | Lim | ..................... G05D 1/0088 |
| 2019/0219398 | A1* | 7/2019 | Sun | ......................... G01C 21/10 |
| 2019/0294869 | A1* | 9/2019 | Naphade | ................... G06T 7/73 |
| 2021/0004075 | A1* | 1/2021 | Protter | ..................... G06N 3/08 |
| 2021/0171024 | A1* | 6/2021 | Grigorescu | .......... G05D 1/0289 |
| 2022/0355805 | A1* | 11/2022 | Kim | ......................... G06N 3/02 |
| 2023/0075165 | A1* | 3/2023 | Lindquist | ................. G06N 3/09 |
| 2023/0320262 | A1* | 10/2023 | Woo | ..................... G05D 1/0246 |
| | | | | 56/10.2 A |
| 2024/0151535 | A1* | 5/2024 | Foloppe | ............... G01C 21/165 |
| 2024/0174257 | A1* | 5/2024 | Li | ........................ B60W 60/001 |
| 2024/0295661 | A1* | 9/2024 | Jalalirad | ................ G01S 19/20 |
| 2024/0372636 | A1* | 11/2024 | Ermolov | ............. H04W 64/003 |

OTHER PUBLICATIONS

CN 111947644 B, Huo et al., "Outdoor mobile robot positioning method and system and electronic equipment thereof", published Apr. 12, 2022, English coverpage provided by IP.com and English translation of description provided by Espacenet (benefit of paragraph numbers) (Year: 2022).*

* cited by examiner 100, 300

GROUP CONTROL SYSTEM AND GROUP CONTROL METHOD

CROSS-REFERENCE TO RELATED APPLICATION

This application claims priority to Japanese Patent Application No. 2023-087172 filed on May 26, 2023, incorporated herein by reference in its entirety.

BACKGROUND

1. Technical Field

The present disclosure relates to a group control system and a group control method.

2. Description of Related Art

A mobile object group control system that issues control commands for a plurality of mobile objects configured to autonomously travel in a predetermined area estimates pieces of position information of the mobile objects, and creates route courses of the mobile objects based on the estimated pieces of position information so that the mobile objects do not interfere with each other (Japanese Unexamined Patent Application Publication No. 2017-142778 (JP 2017-142778 A)).

SUMMARY

In the above related art, acceleration and deceleration of each mobile object are not considered. Therefore, the estimated position of the mobile object and the actual position of the mobile object deviate from each other due to a motion behavior of the mobile object caused by the acceleration and deceleration of the mobile object. Thus, group control cannot be performed based on correct position information. When a plurality of autonomous mobile robots (AMRs) is introduced in a narrow location where the effects of acceleration and deceleration are large, the AMRs may come into contact with each other and the layout may need to be changed, which may lead to an increase in costs.

The present disclosure has been made to solve such problems, and an object thereof is to provide a group control system and a group control method in which group control can be performed based on correct position information by machine learning in consideration of acceleration and deceleration data.

A group control system according to an aspect of the present disclosure is configured to control a plurality of mobile objects configured to travel autonomously. The group control system includes:

at least one memory configured to store instructions;

at least one control unit configured to execute the instructions; and acceleration sensors and position sensors attached to the mobile objects.

The control unit includes:

a position information estimation unit configured to estimate pieces of position information of the mobile objects;

a route planning unit configured to create route plans of the mobile objects based on the estimated pieces of position information;

an acceleration data acquisition unit configured to acquire pieces of acceleration data from the acceleration sensors; and a mobile object position acquisition unit configured to acquire actual positions of the mobile objects using the position sensors.

A deep reinforcement learning model is trained to correct, based on the acquired pieces of acceleration data, deviation amounts between the actual positions of the mobile objects acquired using the position sensors and estimated positions of the mobile objects.

A group control method according to an aspect of the present disclosure is a method for controlling a plurality of mobile objects configured to travel autonomously.

The group control method includes:

estimating pieces of position information of the mobile objects;

creating route plans of the mobile objects based on the estimated pieces of position information;

acquiring pieces of acceleration data from acceleration sensors; and acquiring actual positions of the mobile objects using position sensors.

A deep reinforcement learning model is trained to correct, based on the acquired pieces of acceleration data, deviation amounts between the actual positions of the mobile objects acquired using the position sensors and estimated positions of the mobile objects.

According to the present disclosure, it is possible to provide the group control system and the group control method in which the group control can be performed based on the correct position information in consideration of the acceleration and deceleration data.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, specific embodiments to which the present disclosure is applied will be described in detail with reference to the drawings. However, the disclosure is not limited to the following embodiment. Further, for clarity of explanation, the following description and the drawings are simplified as appropriate.

Figure 1:
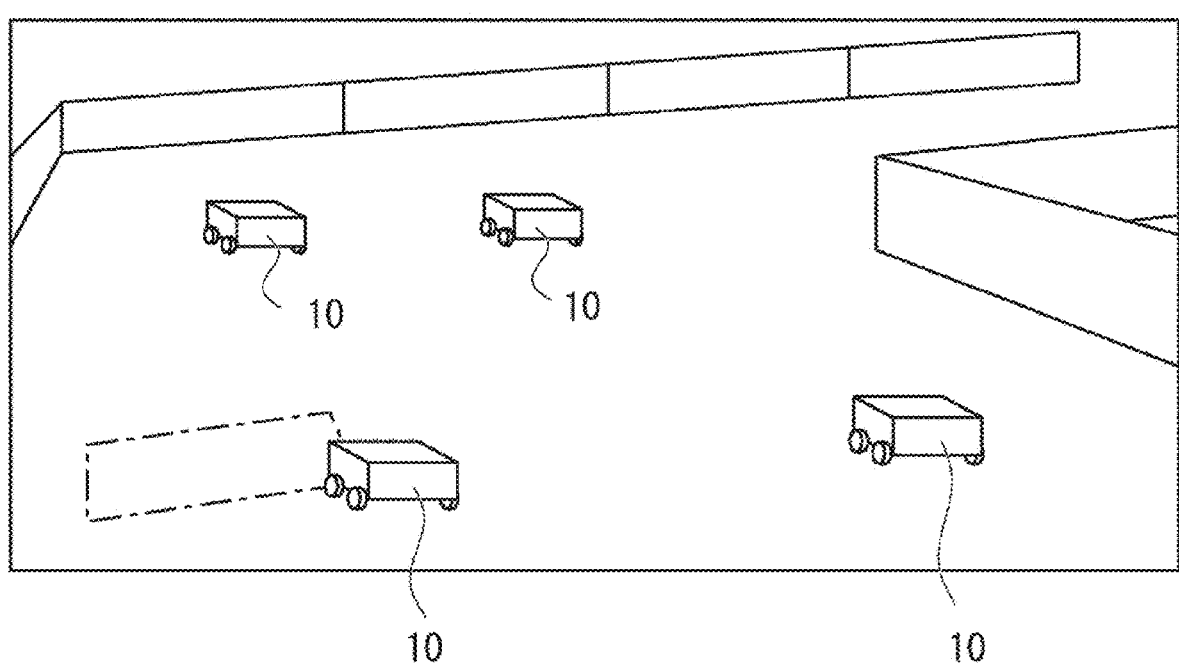
FIG. 1 is a diagram for explaining a state of a AMR when an actual machine is tried.

In a factory or the like, a plurality of Autonomous Mobile Robot (AMR) are autonomously traveling to transport articles in order to support and replace a task performed by a person. AMR are basically capable of estimating their own position individually and of autonomously traveling in a predetermined area according to the route planning. However, as shown in FIG. 1, if a large number of AMR travel in a narrower area when a AMR actual vehicle tries to travel, AMR may touch each other. Therefore, a group control device of a large number of AMR as a whole is introduced so that AMR do not collide with each other or interfere with each other.

Figure 2:
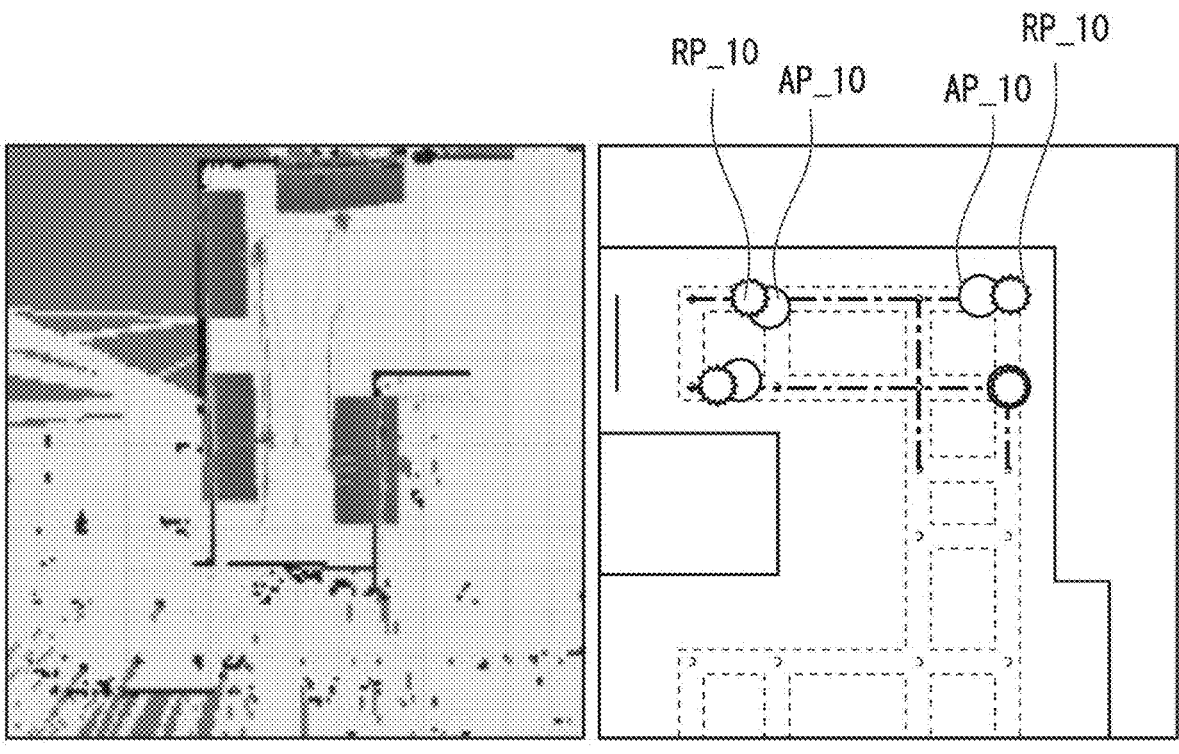
FIG. 2 shows the position of AMR and the actual position of AMR recognized by the group control system.

FIG. 2 shows the position (RP_10) of AMR recognized by the group control system and the actual position (AP_10) of AMR. The position of AMR recognized by the group control system is a position at which AMR is estimated to be present at a certain time when the destination (goal) is set in AMR and AMR is moved according to the route planning to the goal. On the other hand, the actual position of AMR is the actual position of AMR determined using a position sensor (e.g., a LiDAR).

As shown in FIG. 2, the position (RP_10) of AMR recognized by the group control system and the actual position (AP_10) of AMR are slightly shifted. This may be attributed to the fact that in the narrow area, the effects of accelerations become more pronounced when AMR is moved. When various AMR differing in shapes, sizes, and the like are used and tried in an actual machine in the same manner, the same positional deviation occurs.

Figure 3:
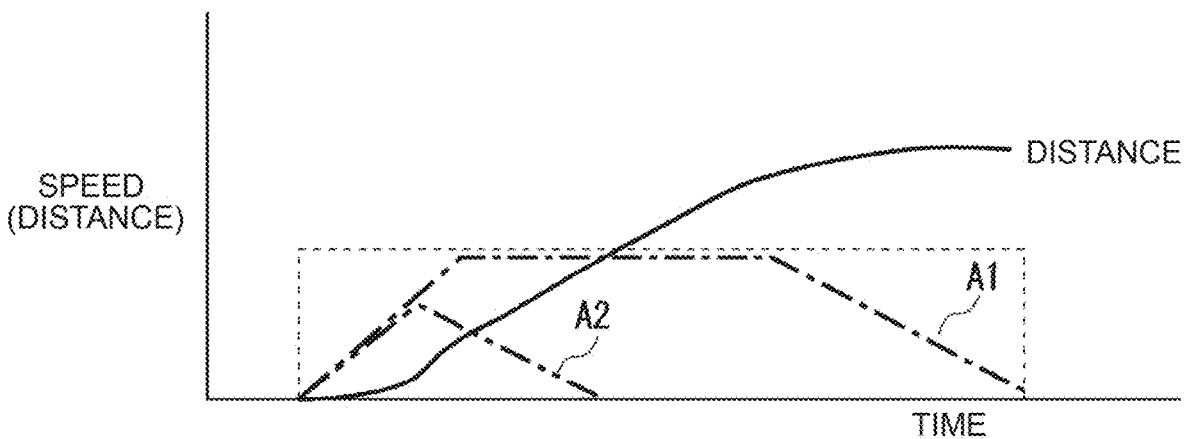
FIG. 3 is a graph showing the velocity-time relationship in some cases.

FIG. 3 is a graphical representation of velocity-time relationships for several AMR running cases. Since the acceleration is the rate of change of the speed per unit time, FIG. 3 also shows the acceleration. In A1, it is shown that the mobile object accelerates from the stopped state, then moves at a constant speed, then decelerates and stops. In a relatively large area, the mobile object accelerates and decelerates as shown in A1. In A2, it is shown that the mobile object accelerates from the stopped state and then decelerates and stops prior to reaching the constant speed state. The deviation between the position of AMR recognized by the group control system and the actual position of AMR is more pronounced in A2 where acceleration/deceleration in a narrow area is required. In addition, even in the case of A1, in the case where the constant speed condition is relatively short or the like, the positional deviation may occur due to the effect of the acceleration and deceleration. In general, in a narrow layout, positional deviation due to the influence of acceleration and deceleration appears more remarkably than in a wide layout.

Therefore, in the present embodiment, a group control system and a group control method capable of performing group control based on correct position information in consideration of acceleration of a mobile object are provided. More specifically, a deep reinforcement learning model is used to correct for AMR misalignment based on the acquired AMR accelerations.

Figure 4:
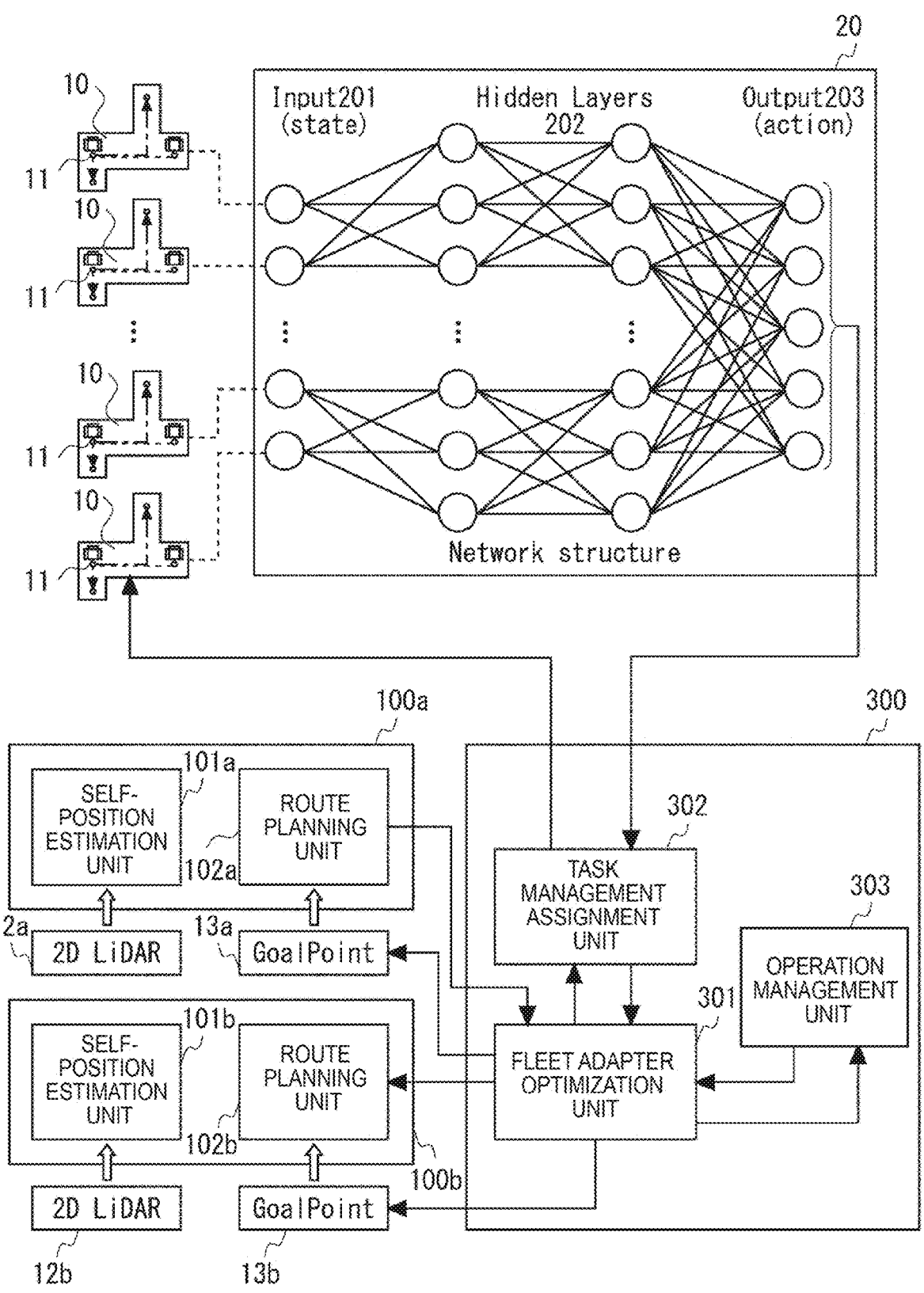
FIG. 4 is a schematic diagram illustrating a configuration of a group control system according to the embodiment.

FIG. 4 is a schematic diagram illustrating a configuration of a group control system according to the present embodiment. Acceleration sensors (e.g., gyro sensors, Inertial Measurement Unit (IMU)) are mounted on AMR managed by the group control system. Acceleration/deceleration data of each time is acquired from an acceleration sensor mounted on each AMR. The acquired acceleration/deceleration data is input to the input layer 201 of the deep reinforcement learning model 20. The input layer 201 is also referred to as an acceleration data acquisition unit. In the example of FIG. 3, for example, acceleration at the time of acceleration from the stop state, acceleration at the constant speed state, deceleration from the deceleration to the stop state, and the like may be input at predetermined intervals. The input layer 201 of the deep reinforcement learning model 20 also receives the actual position of AMR and the position of AMR recognized by the group control system. As the deep reinforcement learning model, a is used in the present example, but the present disclosure is not limited thereto, and various neural network models that can be understood by a person skilled in the art can be used.

The deep reinforcement learning model 20 corrects the deviation amount between the actual position of AMR and the position of AMR recognized by the group control system (that is, the deviation amount becomes 0). In addition, the deep reinforcement learning model learns as a reward so that the positions of the actual AMR of the plurality of AMR do not overlap each other (that is, so that AMR do not touch each other). The deep reinforcement learning model is thus given several rewards and learned based on a predetermined amount of input data to generate a learned model.

An autonomous travel control device 100 corresponding to each mobile object 10 is provided. The autonomous travel control device 100 is composed of a processor such as Central Processing Unit (CPU) or Graphics Processing Unit (GPU) and a computer including memories. The autonomous travel control device 100 controls the autonomous travel of the mobile object 10 to the designated destination. The autonomous travel control device 100 includes a self-position estimation unit 101 and a route planning unit 102, respectively. The self-position estimation unit 101 estimates the position of the mobile object at each time of moving to the destination according to the route plan. The route planning unit 102 sets a destination for each mobile object, and creates a route plan from the current position to the destination. In FIG. 4, two autonomous travel control devices 100 are provided corresponding to two mobile objects, respectively, but three or more autonomous travel control devices 100 may be provided corresponding to three or more mobile objects, respectively.

After the autonomous travel control device 100, a group control device 300 that controls the travel plan so that the travel bands do not collide or interfere with each other is provided. The group control device 300 may be, for example, a server computer with a processor such as Central Processing Unit (CPU) or Graphics Processing Unit (GPU) and memories. The group control device 300 includes an optimization unit 301, a task management assignment unit 302, and an operation management unit 303. The optimization unit 301 optimizes the route plan and the destination from each of the autonomous travel control devices 100 by using the above-described deep reinforcement learning model in consideration of the acceleration data. The task management assignment unit 302 receives the output from the above-described deep reinforcement learning model 20, and assigns tasks such as an optimized route plan and a destination to each mobile object. The operation management unit 303 manages the operation so that each mobile object does not collide with each other.

The task management assignment unit 302 assigns tasks and route data to the respective mobile objects (i.e., AMR) so that AMR do not collide with each other. Each AMR moves in accordance with the assigned task/route information. At this time, the acceleration/deceleration of each AMR is also acquired from each acceleration sensor. In this way, the deep reinforcement learning model is relearned using the acquired acceleration and deceleration values. When environmental changes (e.g., layout-change, increased number of AMR, generation of obstacles, etc.) occur, AMR may collide with each other. Thus, such relearning may be effective in that it is self-modifiable without human intervention. AMR are instructed based on the relearned data.

According to the above-described embodiments, it is possible to instruct the respective AMR to determine the actual AMR due to the acceleration/deceleration and the path in which the positional deviation due to AMR recognized by the group control system is considered. It is possible to utilize a plurality of AMR in a small area, and it is possible to reduce an increase in cost due to a layout change.

Figure 5:
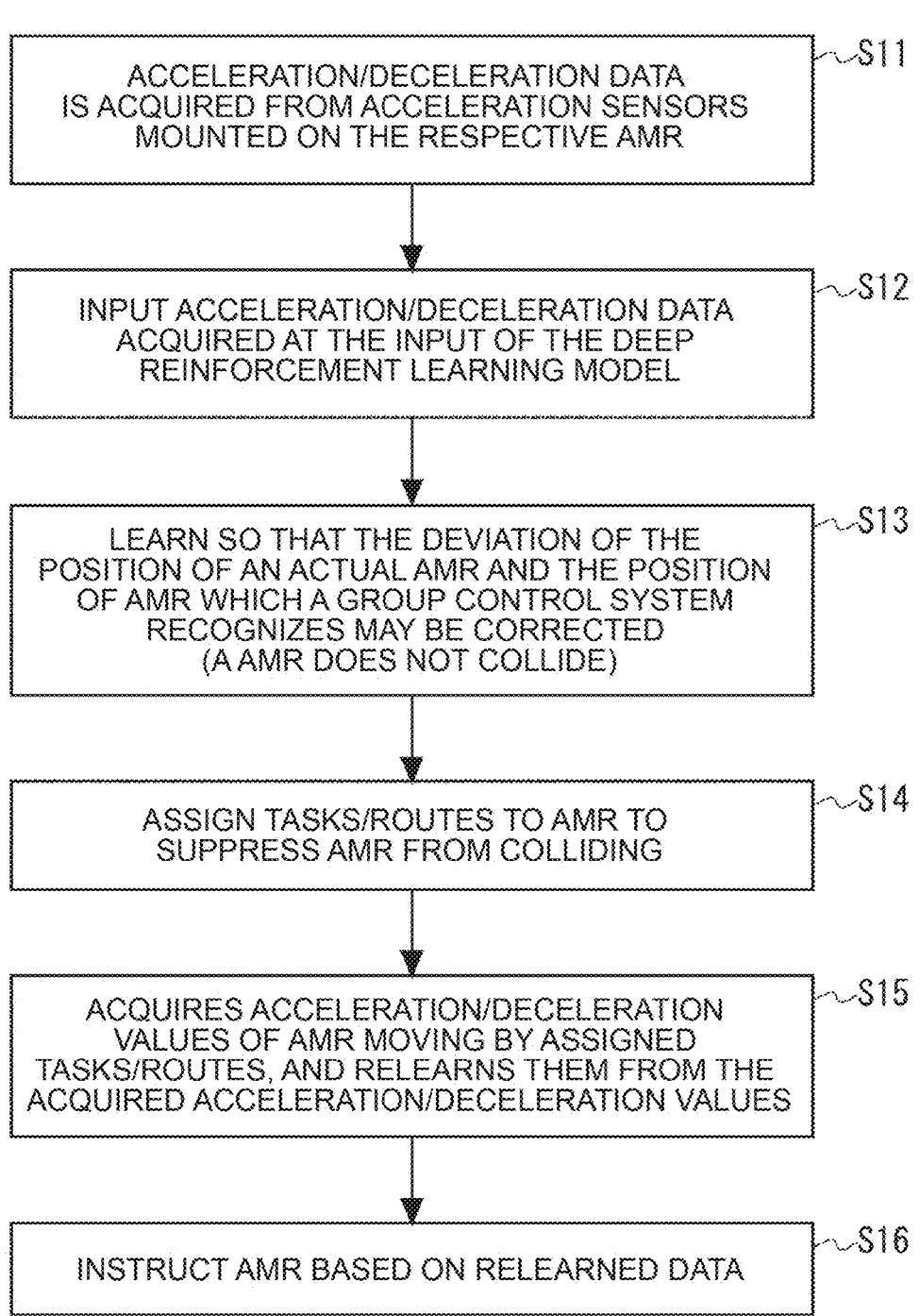
FIG. 5 is a flow chart illustrating a group control method according to an embodiment.

FIG. 5 is a flowchart illustrating a group control method according to the embodiment. The acceleration data acquisition unit acquires acceleration/deceleration data from the acceleration sensors 11 (for example, gyro sensors) mounted on the respective AMR (S11). The acquired acceleration/deceleration data is input to the input of the deep reinforcement learning model (S12). Deep reinforcement learning models are learned to correct the deviation between the position of the actual AMR acquired by the mobile object position acquisition unit and the position of AMR recognized by the group control system (position information estimation unit) using a position sensor (for example, a LiDAR) (AMR do not collide with each other) (S13). The group control device S14 AMR so that AMR do not collide with each other. Acceleration/deceleration values of the respective AMR moving according to the assigned tasks/route information are acquired, and are relearned from the acquired acceleration/deceleration values (S15). The relearned results are S16 to the respective AMR.

Figure 6:
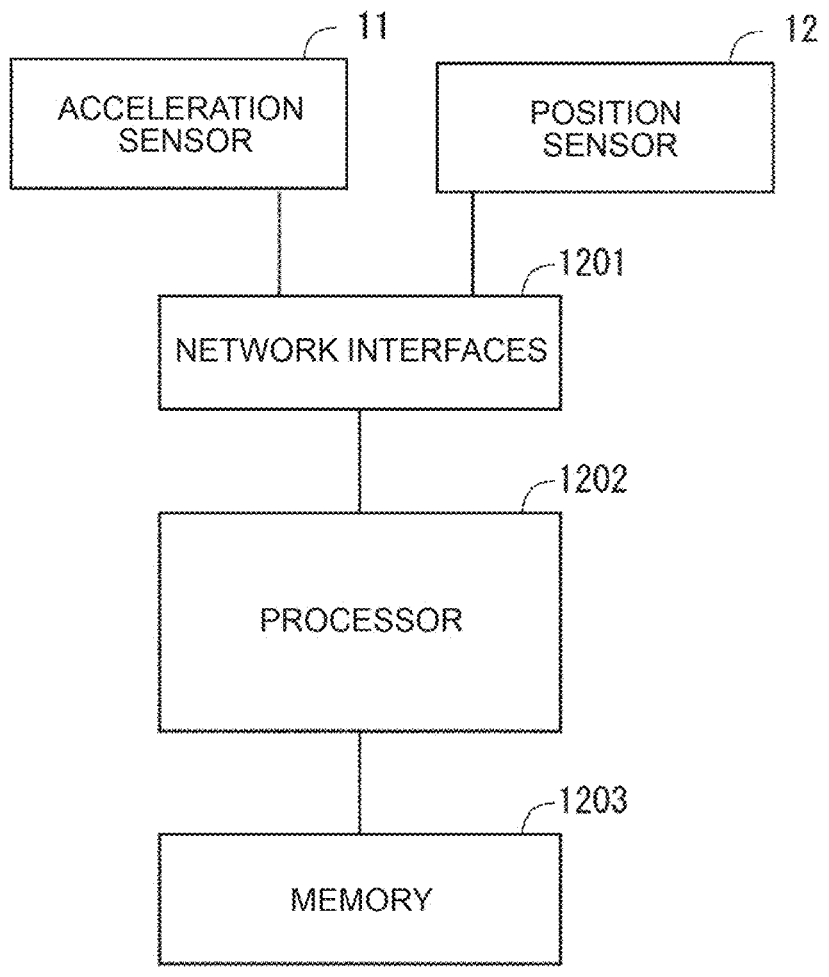
FIG. 6 is a block diagram illustrating a hardware configuration example of the group control system.

FIG. 6 is a block diagram illustrating a configuration example of a group control system including the autonomous travel control device 100 and the group control device 300. Referring to FIG. 6, the group control system includes a network interface 1201, a processor 1202, and a memory 1203. The network interface 1201 is used to communicate with other network node apparatuses constituting the communication system. The network interface 1201 may be used for performing wireless communication. For example, the network interface 1201 may be used to perform radio LAN communications defined in IEEE802.11 series, or mobile communications defined in 3rd Generation Partnership Project (3GPP). Alternatively, the network interface 1201 may include, for example, a IEEE802.3 series compliant network interface card (NIC). The above-described acceleration sensor 11 and the position sensor 12 are connected to the network interface 1201.

The processor 1202 reads and executes software (computer program) from the memory 1203 to perform processing of the group control system described using the flowchart or the sequence in the above-described embodiment. The processor 1202 may be, for example, a microprocessor, Micro Processing Unit (MPU), Central Processing Unit (CPU), or Graphics Processing Unit (GPU). The processor 1202 may include a plurality of processors.

The memory 1203 includes a combination of a volatile memory and a non-volatile memory. The memory 1203 may include storage located remotely from the processor 1202. The processor 1202 may then access the memory 1203 via I/O interfaces, not shown.

In the example of FIG. 6, memory 1203 is used to store software modules. The processor 1202 can read these software modules from the memory 1203 and execute the software modules, thereby performing the processing of the group control system described in the above-described embodiment.

As described with reference to FIG. 5, each of the processors of the group control system executes one or more programs including instructions for causing a computer to perform the algorithms described with reference to the drawings.

In the examples described above, the program includes instructions (or software code) that, when loaded into a computer, cause the computer to perform one or more of the functions described in the embodiments. The program may be stored in a non-transitory computer-readable medium or a tangible storage medium. By way of example, and not limitation, computer-readable media or tangible storage media include random-access memory (RAM), read-only memory (ROM), flash memory, solid-state drive (SSD) or other memory techniques, CD-ROM, digital versatile disc (DVD), Blu-ray disk or other optical disk storage, magnetic cassettes, magnetic tape, magnetic disk storage or other magnetic storage devices. The program may be transmitted on a transitory computer readable medium or a communication medium. By way of example, and not limitation, transitory computer-readable media or communication media include electrical, optical, acoustic, or other forms of propagated signals.

The present disclosure is not limited to the above-described embodiment, and can be appropriately modified without departing from the spirit. For example, in the above embodiment, AMR has been described as a mobile object, but the present disclosure can also be applied to a vertically movable mobile object such as a drone or an airplane.

What is claimed is:

1. A group control system configured to control a plurality of autonomous mobile objects, the system comprising:

an autonomous travel control device comprising a first processor configured to estimate positions of the plurality of autonomous mobile objects at a predetermined timing, and to create route plans based on the estimated positions; and a group control device comprising a second processor, wherein the second processor is configured to receive output from a deep reinforcement learning model and assign route plans to the respective plurality of autonomous mobile objects, the deep reinforcement learning model being trained using (i) acceleration/deceleration data at predetermined time intervals from an acceleration sensor mounted on each of the plurality of autonomous mobile objects while the plurality of autonomous mobile objects are moving, (ii) actual positions of the plurality of autonomous mobile objects from a position sensor mounted on each of the plurality of autonomous mobile objects, and (iii) estimated positions of the plurality of autonomous mobile objects estimated by the first processor, to correct deviation amounts between the actual positions and the estimated positions, and to learn so that the actual positions of the plurality of autonomous mobile objects do not overlap with each other, manage operation so that the plurality of autonomous mobile objects do not interfere with each other, and when an environmental change occurs, receive output again from the deep reinforcement learning model and assign the route plans again to the respective plurality of autonomous mobile objects, and the deep reinforcement learning model is retrained to cause the plurality of autonomous mobile objects not to interfere with each other.

2. The group control system according to claim 1, wherein the environmental change is at least one of a layout-change, an increased number of the autonomous mobile objects, and generation of obstacles.

* * * * *